Jan. 28, 1969  M. CARMASSI ET AL  3,424,560
PROCESS AND APPARATUS FOR THE OPTIMIZATION
OF CHEMICAL REACTION UNITS
Filed June 21, 1966  Sheet 1 of 2

INVENTORS
MICHEL CARMASSI
GEORGES VANDESANDE
Bacon & Thomas
ATTORNEYS

Jan. 28, 1969  M. CARMASSI ET AL  3,424,560
PROCESS AND APPARATUS FOR THE OPTIMIZATION
OF CHEMICAL REACTION UNITS

INVENTORS
MICHEL CARMASSI
GEORGES VANDESANDE
Bacon & Thomas
ATTORNEYS

United States Patent Office 3,424,560
Patented Jan. 28, 1969

3,424,560
PROCESS AND APPARATUS FOR THE OPTIMIZATION OF CHEMICAL REACTION UNITS
Michel Carmassi, Billere, and Georges Vandesande, Mourenx, France, assignors to Societe Anonyme dite: Societe Nationale des Petroles d'Aquitaine, Courbevoie, France, a corporation of France
Filed June 21, 1966, Ser. No. 559,154
Claims priority, application France, Mar. 8, 1966, 52,500
U.S. Cl. 23—278    2 Claims
Int. Cl. B01j 1/00; C01b 17/04

ABSTRACT OF THE DISCLOSURE

Apparatus for regulating the flow of oxidation air to an oxidation reactor by burning the outlet gases over a catalyst and combining two signals based on the temperature rise over the catalyst and analysis of the combustion product to provide a control signal of definite magnitude and direction.

---

Figure 1:
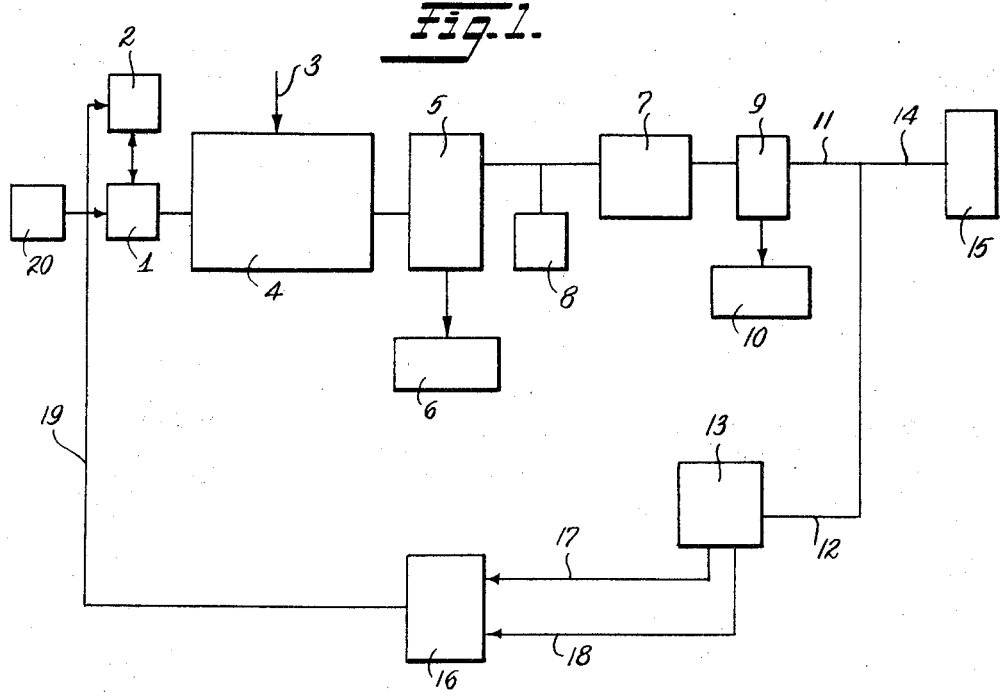

It is well known that chemical reaction units utilized in the production of sulphur by the controlled oxidation of hydrogen sulphide ($H_2S$) dispel into the atmosphere gases whose content in sulphur dioxide ($SO_2$) and hydrogen sulphide is variable as a function of the adjustment of the relationship: input $H_2S$/input air. An insufficiency in supply of input air leaves part of the hydrogen sulphide unoxidized, according to the various reactions occurring in the reactor, thus causing a loss in output of the unit and especially results in the release of $H_2S$ gas into the atmosphere. Likewise, an excess of air leads to a non-optimum output and a release of $SO_2$ into the atmosphere.

Furthermore, it is known that the $SO_2$ content of the effluent gas is easily determined by various physical or physico-chemical means, particularly by infra-red absorption.

It is also known that the $H_2S$ content in hydrogen sulphide in the effluent gases may be determined by oxidation of the $H_2S$ into $SO_2$, which is accompanied by a measurable exothermic release of heat which is exactly proportional to the $H_2S$ content.

The use of calculators for the optimization of mechanical, electrical, chemical or other systems makes it possible to obtain optimum regulation of the reactor by providing a parameter control which is a function of the magnitude of output and of its time scheduled derivatives. Such calculators are described, for example, in the French Patent No. 1,353,156 of the Thomson-Houston Company. Applications of such calculators are familiar for electrical systems. They make it possible to obtain optimization with the aid of a feed back loop. The adjustment of chemical units under optimum conditions may be obtained with the aid of such systems, optimization is then made without the necessity of determining any indication as to the sense of the variations as applied to the unit's inlet control.

The present invention is designed to remedy this disadvantage and concerns a process of optimization ensuring the rapid movement of the regulating system toward its optimum by using one or more auxiliary parameters whose value determines the direction of oscillatory variations imposed at given instances of commutation.

The process consists more particularly in applying, at the inlet of an optimization calculator, two electrical signals, one of which serves in determining the magnitude of the command control signal and the other serves in determining the direction of the variation so as to impose a degree of adjustment in order to obtain the optimum adjustment in a very rapid manner.

In one mode of arrangement, more particularly adapted to chemical units, the magnitude of control may be obtained based on a characteristic magnitude of the outlet gases and a value which determines the direction of the variations is based on another characteristic magnitude of these gases.

In the case of sulphur production units based on oxidizing $H_2S$ containing gas, the first magnitude is obtained from the analysis of the outlet gases and the second magnitude is derived from the rise in the combustion temperature of the $H_2S$ into $SO_2$ in the kiln preceding the analysis chamber.

The present invention also relates to apparatus for determining the $H_2S$ content or $SO_2$ content of the residuary gases.

The device according to the present invention comprises, in combination, means for removing a sample from the main conduit, a combustion kiln into which is injected a combustible gas and a combustion-supporting gas and adjacent the outlet an I.R. absorption analyzer in which the oxidized gases circulate, the I.R. analyzer providing a first electrical signal, means for measuring temperature disposed in the combustion kiln and disposed at the outlet a simple means for calculating the sulphur content of the residuary gases.

Figure 2:
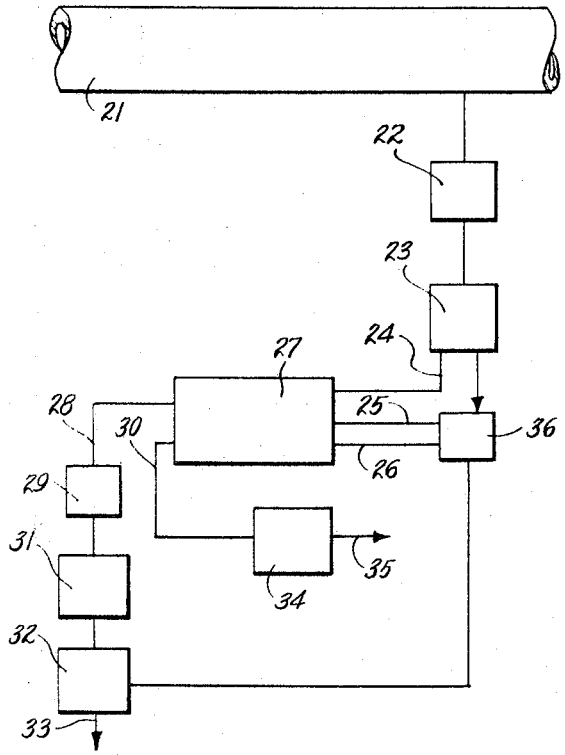
Figure 3:
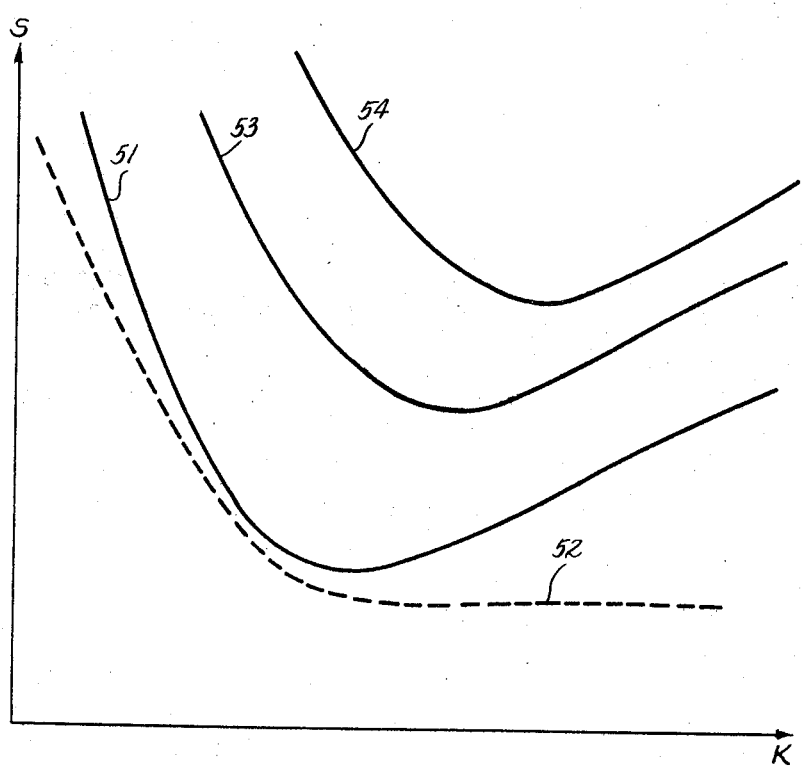
Figure 4:
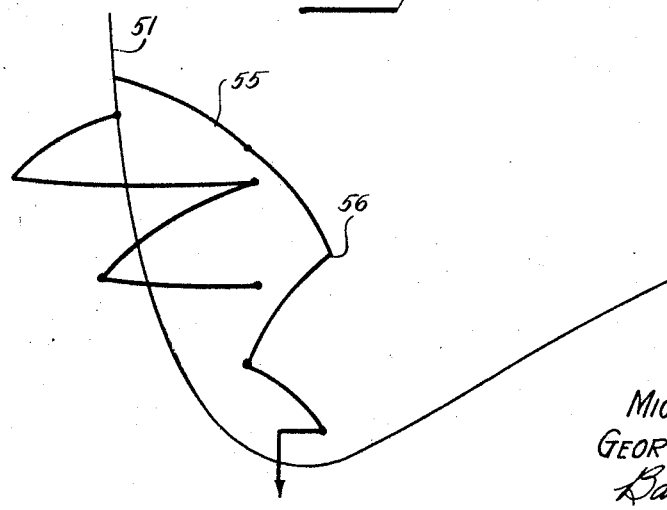

The examples given hereinafter are of a non-limiting illustrative nature only and refer to units for producing sulphur from a gas containing hydrogen sulphide and wherein FIG. 1 is a diagrammatic representational plan view of such a unit;

FIG. 2 is a diagrammatic schematic representation of the sampling system and means for obtaining the necessary electrical signals; and FIGS. 3 and 4 are optimization curves.

Referring to FIG. 1, the inlet means comprises a valve 1 whose position can be regulated by a servomechanism 2 to admit a desired amount of air from source 20. The gas containing hydrogen sulphide is fed through conduit 3 into reactor 4 in which the partial combustion of the $H_2S$ into elemental sulphur is sustained in accordance with the Claus process, for example, the gases, after reaction, pass through a condenser 5 from whence the sulphur flows into collector 6, while the unreacted gases are sent into a catalytic converter 7. At the entrance of the converter, an adjustable valve 8 permits the control of the air-content of the mixture so as to adjust the composition of the mixture to correct proportions. The gases are condensed in condenser 9 and sulphur is collected in collector 10.

The remaining unreacted gases leave condenser 9 through line 11, which branches into line 12, leading to an analyzer 13 and, on the other branch, by way of line 14, to an evacuation chimney 15 dispelling the gases into the atmosphere.

The analyzer 13 supplies a calculator 16 with two electrical signals by means of lines 17 and 18. The electrical quantity 18 is the electrical signal corresponding to the measured $SO_2$ content.

From this signal, one may provide with the aid of a calculator the first and second derivatives and by a known process produce a function of control which will be, through the medium of an electronic optimization apparatus, used in regulating the valve 1 which controls the air inlet.

The signal appearing on line 17 is in the present case the temperature variation observed in the auxiliary kiln disposed beyond the analyzer which serves to further oxidize the sample.

The temperature rises when the sample contains hydrogen sulphide and the temperature remains stable in the absence of $H_2S$, so that the temperature signal can serve to determine the direction of the variations to be imposed on the regulator, particularly a stable temperature indicates that the exit gases contain only SO₂, i.e. that the unit is operating with too much air and that the correction to be made must be a negative correction by diminishing the air to hydrogen sulphide ratio.

On the other hand, if one observes a rise in temperature, the mixture contains substantial quantities of hydrogen sulphide, which signifies that, in order to adjust the unit toward optimum conditions, the air to hydrogen sulphide ratio should be increased.

This indication may, by appropriate means, be incorporated in the control system so that the corrective action be such that the regulation be motivated toward the correct direction. For example, the command signal worked out by the calculator 16 commands the servo-mechanism 2 by line 19. The adjustment thus effected regulates the air to hydrogen sulphide relationship and makes it possible to obtain the unit's operation under optimum conditions in very short time.

In FIG. 2 is shown a device for analyzing exit gases. From main conduit 21 the sample is removed by sampler 22 controlled by an outlet regulator 23. The gases are injected through line 24 into kiln 27. Two intake lines 25 and 26 supply, at a fixed rate, this kiln with air and methane respectively from intake supply 36.

A conduit 28 supplies the burned gases to the heat exchanger 29 and then to the analyzer 31 which delivers an electric signal to the comparison control means 32. Control means 32 is designed to incorporate the relationship between the flow of exit gases on the one hand and the flow of methane and air on the other hand. It is thus seen that signal 33 emanating from controller 32 is then proportional to the sulphur content of the exit gases circulating in the conduit 21.

Element 30 measures the combustion temperature of the gases in the kiln 27.

A simple device 34, such as a differentiator circuit, for example, furnishes in line 35 the sense of temperature variation. The signals available in 33 and 35 may be used in determining the final control signal and in determining the direction of variations respectively.

In actual application, the calculators that can be used are those manufactured by the French Thomson-Houston Company, in particular in accordance with French Patent No. 1,353,156 and French application Nos. 13,165 of April 14, 1965, and 42,980 of December 20, 1965, providing for the regulation of successive oscillations.

The operation of the analyzer device, which is necessary to an understanding of the operation of the optimization process, will be described first. The residuary gases circulating in the conduit 21 are composed of, for example, $CO_2$, $N_2$, $H_2S$, $SO_2$, etc. The sampling is effected with the help of sampling device 22 which permits the removal of a representative sample. The relationship between this sample and the supply of air 25 and of methane 26 is regulated. In a simple version, these three outlets may be kept constant. The combustion gives a gas containing only $SO_2$ and the $SO_2$ content is directly related to the content in $H_2S$ and $SO_2$ of the exit gases present in the conduit 21. In an actual application, there was obtained, with the outlets adjusted for a stoichiometric combustion to sulphur, an ($H_2S$, $SO_2$ content)$=1.32 \times s$ (measured content in 31). Furthermore, the thermo-couple 30 gives a signal whose derivative worked out in 34 determines a polarity in 35.

The operation of the regulation control device is more complicated. It is necessary to refer to FIG. 3. In this figure is graphed in ordinate the content in sulphur containing gas of the gaseous current circulating in line 21 and in abscissa the relationship K of the air supply to the supply of gas containing hydrogen sulphide injected in the unit (curve 51). One notes that the curve shows a minimum.

In the same figure is shown, in a dotted line, the temperature in the combustion kiln 27 (curve 52).

The regulation of the unit will consist in controlling the relationship between the air supply and the supply of acid gas containing hydrogen sulphide in such manner that the content in hydrogen sulphide and/or sulphur dioxide of the exit gases shall be at a minimum.

It should be borne in mind that the minimum described in FIG. 3 is not a fixed minimum, but that this minimum fluctuates as a function of the uncontrollable external parameters such as, for example, the hydrogen sulphide content of the injected gas. Such variations from curve 51 to curves such as 53 or 54 are illustrated.

The process of optimization consists primarily in working out a means of control with the aid of a calculator. Given H as the content in sulphur containing gas of the exit gas, the calculator works out a relationship such as:

$$e = K_1 \frac{dh}{dt} + K_2 \frac{d^2h}{dt^2} - Z$$

for example, which will lead to oscillation cycle limits if the transfer function of the system is of the form:

$$W = \frac{e^{-rs}}{\sum a_j s^j}$$

The process of commutation is described in Automatisme, vol. IX, of March and April 1964, in articles by Messrs. Helein, Perret and Roussell, who describe on page 146 a sequence of optimization with a conventional calculator. One defines as sequence of optimization the overall operations necessary to obtain the adjustment to the optimal value. In FIG. 4 one notes in particular that the calculator described can make the unit evolve in two directions—either favorable or unfavorable.

Application of the process in accordance with the invention makes it possible to employ the signal 35 derived in 34 (FIG. 2) which establishes a polarity for the action signal and this signal makes the unit evolve in the favorable direction. The unit's evolution is then represented by a curve such as 55 (FIG. 4). One is thus assured that the commutation will take place in the direction which is conducive to obtaining the minimum.

The optimization sequence is such that, after obtaining two natural commutations, the calculator works out an adjustment value which is a balance between the two adjustments corresponding to the above mentioned commutations.

A new cycle will be undertaken, quite familiar in automation, triggered either by predetermined timing means or by a predetermined variation threshold.

What we claim is:

1. Apparatus for the automatic regulation of the flow of oxidation air in a chemical oxidation reactor in which the content of an oxidation product in the effluent gas is controlled, comprising means connected to the outlet pipe of said reactor for continuous sampling of said effluent gas, a pilot kiln containing a catalyst for catalytic combustion of oxidizable components of said sampled gas, means for continuously introducing said sampled gas into said pilot kiln, means for continuously supplying said kiln with combustible gases and combustion supporting gases, flow regulator means interconnecting said means for introducing said sampled gas into the pilot kiln and said means for supplying combustible gases and combustion supporting gases to the pilot kiln, means for analysis of the combustion gases leaving the pilot kiln and resulting from the combustion of said sampled gas and of the supplied combustible gases and for delivering an electric signal proportional to the content of said oxidation product in the gases leaving the kiln, means for modifying said electrical signal in accordance with the relationship between the flow of kiln exit gases and the flow of combustible and combustion supporting gases to provide an electrical signal proportional to the content of oxidation product in the burned sampled gas, means for measuring the temperature of the combustion catalyst in the pilot kiln and for delivering an electrical signal proportional to the temperature of the catalyst, means for determining the variation of the electrical signal proportional to the temperature of the catalyst and for delivering an electric signal having a polarity which varies as a function of the variation of the temperature whereby the electrical signal proportional to the content of said oxidation product in the burned sampled gas and the electrical signal having a polarity representative of the temperature variation may be combined to produce a control function of magnitude proportional to content of said oxidation product in the burned sampled gas and of direction dependent on temperature.

2. Apparatus for the automatic regulation of the flow of air to a reactor for the production of sulfur by oxidation of hydrogen sulphide, comprising: means for the continuous selection of a sample of the effluent gases in the outlet of the reactor, a pilot kiln containing a combustion catalyst for catalytic combustion of any $H_2S$ in said sample, means for continuously introducing said sample into the pilot kiln, means for continuously supplying said kiln with combustible gases and combustion supporting gases, flow regulator means interconnecting said means for introducing said sample and said means for supplying combustible gases and combustion supporting gases to the pilot kiln, means for analysis of the combustion gases leaving the pilot kiln and resulting from the combustion of the sample and of the combustible gases and for delivering an electrical signal proportional to the content of sulfur dioxide of the kiln effluent gases, means for modifying said electrical signal in accordance with the relationship between the kiln effluent gases and the combustible and combustion supporting gases to provide an electrical signal proportional to sulfur dioxide content of the burned sample, means for measuring the temperature of the combustion catalyst in the pilot kiln and for delivering an electrical signal proportional to the temperature of the catalyst, means for determining the variation of the electric signal proportional to the temperature of the catalyst and for producing an electrical signal having a polarity which varies as a function of the variation of the temperature, whereby the electrical signal proportional to the content of sulfur dioxide in the burned sample and the signal having a polarity representative of the temperature variation may be combined to produce a control function having a magnitude proportional to the total content of sulfur in the reactor effluent gases and a direction dependent upon the presence or absence of excess $H_2S$ in the reactor effluent gases as determined by the temperature of the catalyst in the pilot kiln.

References Cited

UNITED STATES PATENTS

| | | | |
|---|---|---|---|
| 3,338,664 | 8/1967 | Bally et al. | 23—2 |
| 3,321,280 | 5/1967 | Trotter et al. | 23—232 |
| 3,312,529 | 4/1967 | Evano | 23—232 |
| 3,138,436 | 6/1964 | Harmon. | |
| 3,026,184 | 3/1962 | Karasek. | |
| 2,813,010 | 11/1957 | Hutchins | 23—232 |
| 1,923,865 | 8/1933 | Handforth | 23—162 |

EARL C. THOMAS, *Primary Examiner.*

G. O. PETERS, *Assistant Examiner.*

U.S. Cl. X.R.

23—255, 232, 224